No. 683,268. Patented Sept. 24, 1901.
J. G. GARDNER.
PROCESS OF TREATING SAWDUST OR OTHER GRANULAR MATERIAL.
(Application filed May 23, 1900. Renewed Feb. 19, 1901.)
(No Model.)
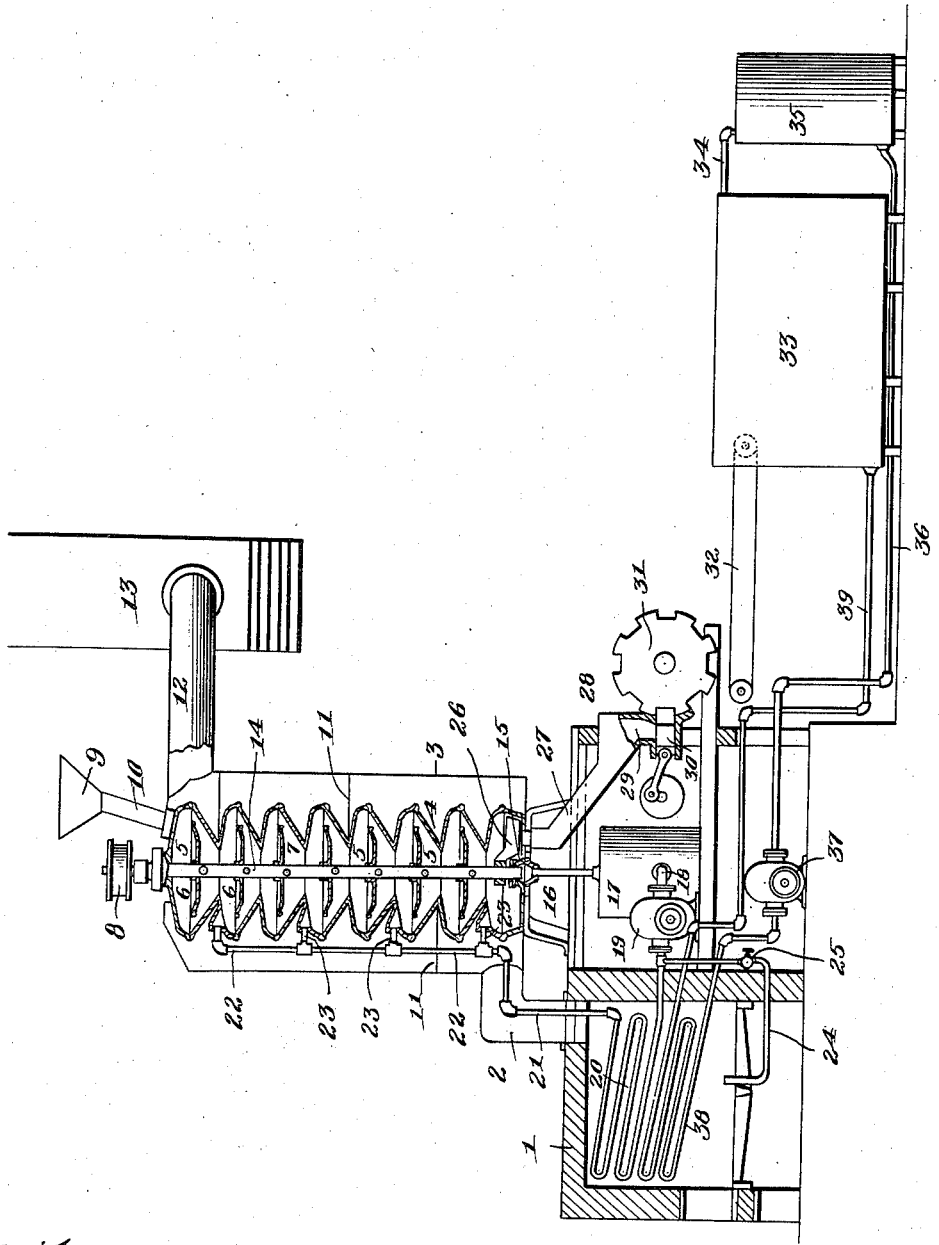

UNITED STATES PATENT OFFICE.

JOSHUA G. GARDNER, OF BALTIMORE, MARYLAND, ASSIGNOR OF ONE-HALF TO JOHN MITCHELL, JR., OF WASHINGTON, DISTRICT OF COLUMBIA.

PROCESS OF TREATING SAWDUST OR OTHER GRANULAR MATERIAL.

SPECIFICATION forming part of Letters Patent No. 683,268, dated September 24, 1901.

Application filed May 23, 1900. Renewed February 19, 1901. Serial No. 48,002. (No specimens.)

*To all whom it may concern:*

Be it known that I, JOSHUA G. GARDNER, a citizen of the United States, residing at Baltimore, in the State of Maryland, have invented new and useful Improvements in Processes of Treating Sawdust or other Granular Materials, of which the following is a specification.

This invention relates to a process of treating sawdust or other granular material for drying or partly carbonizing the same, so as to eliminate acid, oil, or other by-products, and in the case of sawdust to bring the same into such condition that it can be readily briquetted without the use of a separate binder, the briquets to be made into any desired shapes suitable, for instance, for use as shingles, roofing material, chair-bottoms, table-tops and other articles or by further treatment to be completely carbonized and thus converted into fuel.

It is among the purposes of my invention to effect the drying or partial carbonization of sawdust or other granular material by centrifugal action and heat in such manner as to separate the grains or particles from each other, so that they may be thoroughly subjected to the heating and drying medium, thereby quickly eliminating in a state of gas or vapor any acids or light oily constituents of the material under treatment.

It is another object of my invention to condense in part the vapors or gaseous matters eliminated from the sawdust or other granular material, and after reheating the non-condensible gases it is my purpose to utilize the same for heating and drying continuously-supplied quantities of material.

In the case of sawdust or the like it is a further object of my invention to bring the sawdust rapidly and economically into a brown or partially-carbonized condition suitable for briquetting without the aid of a binder and to produce briquets of any desired shape for the manufacture of various useful articles.

Another object of my invention is to produce a cheap and economical fuel by converting the dried and partially-carbonized sawdust or the like into briquets of convenient dimensions and then completely carbonizing such briquets to remove all volatile matter.

My process of treating sawdust or other granular material for drying or carbonizing the same and to eliminate acids and other by-products consists in subjecting the material under treatment to the action of centrifugal force and to impact in such manner as to separate from each other every grain or particle of the material and simultaneously causing the separated grains or particles to gravitate through hot gases or other aeriform heating medium, so that each particle or grain of material will be completely surrounded and permeated by the heating and drying medium, thereby effecting the extraction of volatile matters to any required extent, according to the degree of heat employed, and at the same time drying and more or less carbonizing the material with speed and economy.

In carbonizing sawdust or the like to produce a charcoal fuel there will be two periods of carbonization, viz: The first period of carbonization, which is only partial and will give a brown dust suitable for briquetting. The second period will give the completely-carbonized or black charcoal. In the first period when the dust comes out brown all the pyroligneous acid is vaporized and the fiber of the sawdust is left intact and can be readily pressed into briquets of any desired shape without requiring a binder. In the second period or carbonization of briquets all the heavy oil-vapors and other by-products are extracted and the charcoal is ready for the market. The sawdust will be properly browned in the first period of carbonization by being subjected under centrifugal action to a temperature of about 120° to 220° centigrade, its fiber is not injured, but is suitably seasoned by being relieved of acids and other chemicals that would be objectionable in articles of furniture, and yet this browned or seasoned fiber can be pressed into any desired shapes without employing a separate binding agent. Furthermore, after briquetting the browned sawdust the briquets may be subjected to the action of hot gas at a temperature, say, of 350° centigrade, which will take out all the oil-vapors and leave a pure black charcoal suitable for fuel.

When loose sawdust is carbonized fully or made black from heat, it cannot be briquetted except by use of a binder or mixer, because of the fiber being destroyed. It can be briquetted in the condition that it comes from the saw, but it will then have the acid matters in it, and after briquetting it will be difficult or impossible to remove these without injury or destruction of the fiber. Hence the advantage of seasoning or browning and partially carbonizing the sawdust before briquetting, objectionable acids and other matters being thus removed and the fiber preserved intact, so that the material can be readily manufactured into various articles, while by a further carbonization, if desired, an economical fuel is produced. It is a further advantage of my process of treating sawdust or the like that valuable by-products are obtained by condensation of the gases or vapors thrown off from the treated material and that by reheating the non-condensible gases they are economically utilized for the heating and carbonization of continuously-supplied quantities of fresh material.

The annexed drawing illustrates in part sectional side elevation an apparatus adapted to be employed in carrying out my process for the treatment of sawdust or other granular material, in drying, seasoning, or carbonizing the same, and for the manufacture therefrom of briquets suitable for various useful purposes.

In practicing my invention for the drying, seasoning, or carbonizing of sawdust or other granular material a fire is to be started in a furnace, (designated by the reference-numeral 1.) The products of combustion from the furnace pass out through a flue 2 into the lower part of a heating jacket or casing 3, inclosing a retort 4, comprising a number of communicating retort-chambers 5, each of which is preferably in the form of a truncated cone. In each of these retort-chambers there is located a horizontally-arranged centrifugal disk 6, carried by a vertically-arranged tubular shaft 7, that is suspended within the retort. A pulley 8 is provided on the upper projecting end of the tubular shaft 7 for the application of power to rotate said shaft and attached centrifugal disks. The sawdust or other material to be treated is fed through a hopper 9 and chute 10 into the uppermost retort-chamber 5 and falls therein upon the uppermost centrifugal disk. By the centrifugal action due to the rapid rotation of this disk the sawdust is thrown outward and slightly upward into forcible contact with the upper portion of the retort-chamber. The centrifugal action and the force of impact to which the sawdust or other granular material is subjected cause the separation or segregation of each and every grain or particle from all the others, thereby breaking up any agglomerated or compacted condition of the material. In this separated condition the material gravitates from one retort-chamber to another, meanwhile being subjected to the further action of centrifugal force as the material falls upon the several rotating disks in succession, and thus the grains or particles of the material are kept separated throughout the passage of said material through the retort. The heated products of combustion from the furnace 1 and furnace-flue 2 are caused to pass in a tortuous direction around the retort 4 by means of baffle-plates 11, that are arranged at suitable points within the retort casing or jacket. Thus by the passage of a heating medium around the retort and through the jacket or casing 3 to an exit-flue 12 and chimney 13 the retort is rapidly heated and may be brought to any required temperature—say from about 120° to 220° centigrade—as may be desired. In falling through the series of retort-chambers the sawdust or other material is thus not only subjected to centrifugal action due to the rapid rotation of the disks 6, whereby the grains or particles are separated, but also and at the same time each and every particle or grain of material is exposed on all sides to the heating action of the aeriform contents of the retort. As soon as the grains or particles thus become sufficiently heated the pyroligneous acid and light oily matters contained in said grains or particles of sawdust or like material will become vaporized, and the gases or vapors being themselves heated will react on the grains or particles and continue the drying, seasoning, browning, or partial carbonizing of the granular material. The hot gases or vapors accumulating in the retort will pass off gradually into the tubular rotary shaft 7 through suitable openings 14, arranged therein, preferably below each centrifugal disk, at points where the sawdust or granulated material is not liable to enter along with the gas. The hot gases that enter the tubular rotary shaft 7 are drawn therefrom at its lower end through a flanged opening 15 in the bottom of the retort, the said opening 15 being also in communication with a pipe 16, leading to a condenser 17, in which the condensible gases are collected. The non-condensible gases are drawn from the condenser 17 through a suitable pipe connection 18 by means of a blower 19 and are conveyed thence to a heating-coil 20, located in the furnace and wherein these non-condensible gases are reheated. From this coil 20 the heated gases are conducted by pipe connections 21 and 22 to lateral branches 23, that communicate with the interior of the retort 4 at suitable points. The gases and vapors that were eliminated from the material under treatment in the retort are thus after reheating utilized for the heating, drying, and carbonization of continuously-supplied quantities of fresh material. If desired, any surplus gas from the blower 19 may be conducted through a pipe 24 into the furnace 1 to be employed for heating the furnace instead of using ordinary fuel. A valve 25 in the pipe 24 may be provided to control the supply of gas for heating the furnace. When the browned or partially-carbonized sawdust or other granular material reaches the bottom of the retort 4, it is carried around therein by a rotary sweep 26, actuated by the rotary shaft 7 and is thereby conducted to an opening in the bottom of the retort communicating with a chute 27 for discharge of the browned or carbonized material. This browned or carbonized material has been properly seasoned by the treatment to which it was subjected in the retort 4 and is now in condition to be briquetted into any desired shape without requiring the use of a binding agent or mixer. The chute 27 may therefore lead direct to a briquetting-machine 28 of any suitable construction.

The briquetting-machine that I have illustrated comprises a hopper 29, reciprocating plunger 30, and rotary mold-wheel 31; but this precise mechanism is not essential, as any other suitable briquetting devices may be employed.

From the briquetting mechanism the briquets are discharged upon an endless conveyer 32, leading into a carbonizing-retort 33, which may be of any suitable construction and in which hot gases at a temperature of about 350° centigrade may be employed for completing the carbonization of the briquets when they are intended to be used as an article of fuel. In this carbonizing-retort 33 the heavy oily matters contained in the briquet are vaporized or driven off and are preferably conducted through a pipe 34 to a condenser 35, where the condensible matters are collected. The non-condensible gases leave the condenser 35 through a pipe 36, leading to a blower 37, whence they are driven through suitable pipe connections into a heating-coil 38, located in the furnace 1, before mentioned. The reheated gases are conducted from the coil 38 through a pipe 39, by which they are returned to the carbonizing-retort 33 to be therein utilized for heating the same, thus completing the circuit of these gases through the retort 33, condenser 35, blower 37, and heating-coil 38 in the same manner that a circuit of gases is established from the retort 4 through the rotary tubular shaft 7, condenser 17, blower 19, and heating-coil 20 and its pipe connections with the retort 4, as hereinbefore described. By thus providing circuits for travel of the gases evolved from the material under treatment the said gases can be readily reheated and utilized in each instance for carbonization of fresh supplies of material.

It is among the advantages of my method or process of drying sawdust or other granular materials that by means of centrifugal action and impact all the grains or particles of material are completely separated from each other and caused to gravitate through an aeriform heating medium that can be brought to any required temperature and which surrounds every particle or grain of the material and easily permeates the same to effect the removal of any objectionable volatile matters. By this treatment the material is thoroughly seasoned without subjecting the fiber to destruction or injury. The fiber being thus left intact can be readily briquetted into desired shapes for the manufacture of many useful articles and without requiring the use of a binder, which is not possible with other modes of treatment.

It is another advantage of my invention that when it is desired to produce a fuel briquet the preliminary seasoning and carbonizing by permitting a ready briquetting will facilitate the final carbonization process that is required to economically convert the material into a pure charcoal.

Another advantage of my invention results from the facility with which valuable by-products may be collected, and there is a still further advantage resulting from the utilization of the non-condensible gases as a heating medium in carrying on the process continuously and with a large economy of material.

What I claim as my invention is—

1. The process of treating sawdust, or other material, for drying, seasoning or carbonizing the same, which consists in separating the particles or grains of material by centrifugal force, simultaneously exposing the separated particles or grains to the action of hot gases to vaporize and remove volatile matter, drawing off the evolved gases or vapors, separating the condensible by-products contained in such gases or vapors, reheating the non-condensible gases or vapors and utilizing the same for the heating of continuously-supplied quantities of fresh material by direct contact therewith simultaneous with the subjecting of the material to the action of the hot gases and centrifugal force, simultaneously discharging the particles or grains of seasoned material and forming the same into briquets, substantially as described.

2. The process of treating sawdust, or other material, for drying, seasoning or carbonizing the same, which consists in separating the particles or grains of material by centrifugal force, simultaneously exposing the separated particles or grains to the action of hot gases to vaporize and remove volatile matter, drawing off the evolved gases or vapors, separating the condensible by-products contained in such gases or vapors, reheating the non-condensible gases or vapors and utilizing the same for the heating of continuously-supplied quantities of fresh material by direct contact therewith simultaneous with the subjecting of the material to the action of the hot gases and centrifugal force, simultaneously discharging the particles or grains of seasoned material, forming the same into briquets, carbonizing the briquets to convert the same into fuel, collecting the condensible products obtained in the carbonizing of the briquets, reheating the non-condensible gases from the carbonizing operation, and utilizing the reheated gases in the carbonization of more briquets, substantially as set forth.

In testimony whereof I have hereunto set my hand in presence of two subscribing witnesses.

JOSHUA G. GARDNER.

Witnesses:
  JAMES L. NORRIS,
  GEO. W. REA.